United States Patent

Hollrock

[15] 3,662,978
[45] May 16, 1972

[54] AIRCRAFT EJECTION SEAT VEHICLE STOWED ROTOR

[72] Inventor: Richard H. Hollrock, Simsbury, Conn.
[73] Assignee: Kaman Aerospace Corporation, Bloomfield, Conn.
[22] Filed: Oct. 22, 1970
[21] Appl. No.: 82,902

[52] U.S. Cl. ......................................... 244/122 A, 244/141
[51] Int. Cl. ........................................................ B64d 25/10
[58] Field of Search ...... 244/122 R, 122 A, 122 AC, 122 AD, 244/122 AE, 122 AH, 141, 138, 140, 17.11, 17.15

[56] References Cited

UNITED STATES PATENTS

| | | | |
|---|---|---|---|
| 2,640,549 | 6/1953 | Isacco | 244/138 AX |
| 2,706,097 | 4/1955 | Johnson | 244/150 X |
| 2,738,021 | 3/1956 | Nagler | 244/17.11 X |
| 3,029,047 | 4/1962 | Jacobson et al. | 244/17.11 |
| 3,042,347 | 7/1962 | Halsey | 244/141 |
| 2,702,601 | 2/1955 | Nagler | 244/17.11 X |

FOREIGN PATENTS OR APPLICATIONS

| | | | |
|---|---|---|---|
| 814,599 | 6/1937 | France | 244/138 A |

*Primary Examiner*—Milton Buchler
*Assistant Examiner*—Carl A. Rutledge
*Attorney*—McCormick, Paulding & Huber

[57] ABSTRACT

A rocket powered aircraft ejection seat is equipped with a stowed helicopter type rotor, and with a stowed anti-torque tail plane, both of which can be deployed after the seat, together with its occupant, has been ejected from a disabled aircraft. The rotor blades are conventionally mounted on a rotor hub, which hub is pivotally mounted to a mast. The mast is movably mounted to the back of the seat so that the hub and blades are movable from a stowed position behind the seat to a deployed position wherein the rotor hub is disposed above and forwardly of the head of the seat occupant. A small drogue or pilot chute is connected to the rotor hub, and when released from its stowed position between the blades serves to swing the rotor hub and blades from their respective stowed positions to intermediate or trail positions wherein the blades can be allowed to rotate and to unfold by centrifugal force. A first actuator moves the mast to its deployed position, and the rotor is positioned for gliding flight with an associated control column being automatically moved into position between the pilots knees to control the cylic pitch of the rotor blades through a suitable control linkage. The tail plane structure includes a pair of parallel booms each of which carries a stabilizer fin, and these booms are stowed, one on either side of the back of the seat, with these fins being conveniently stowed on either side of the seat portion of the overall structure. A second actuator is drivingly connected to a rock shaft at the upper end of the seat back, which rock shaft is pivotally mounted on the seat for rotatably supporting the booms for rearward and upward movement to deploy the tail plane in response to operation of the second actuator. A small gas turbine engine is stowed in the back of the seat between these booms, and is moved to its deployed position by the second actuator through a collapsible engine mount linkage.

13 Claims, 10 Drawing Figures

Patented May 16, 1972
3,662,978
7 Sheets-Sheet 1
FIG. 2
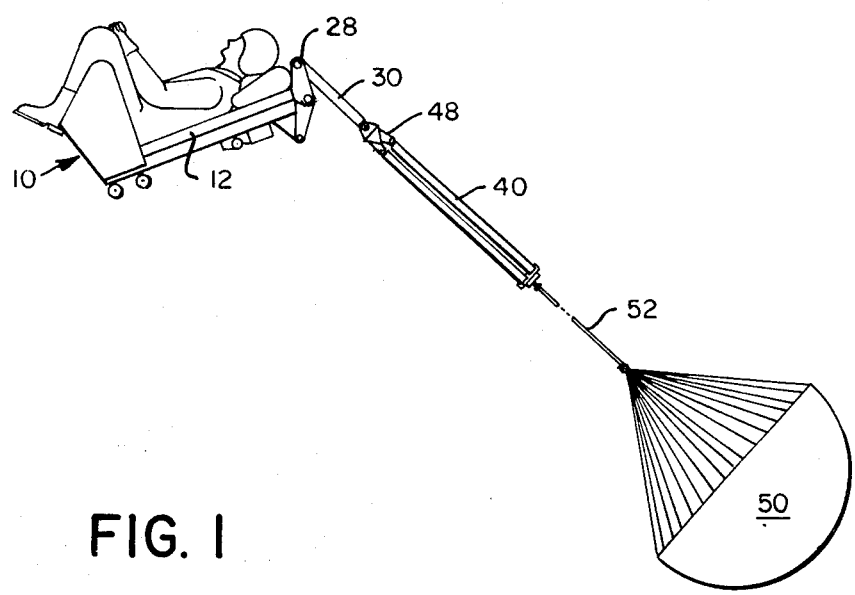
FIG. 1
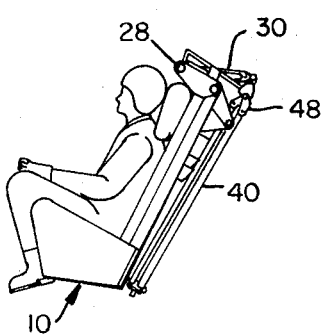
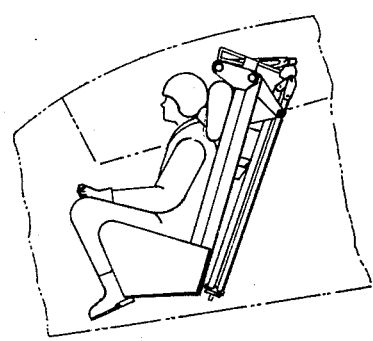
INVENTOR
RICHARD H. HOLLROCK
BY *Merrick, Paulding & Huber*
ATTORNEYS

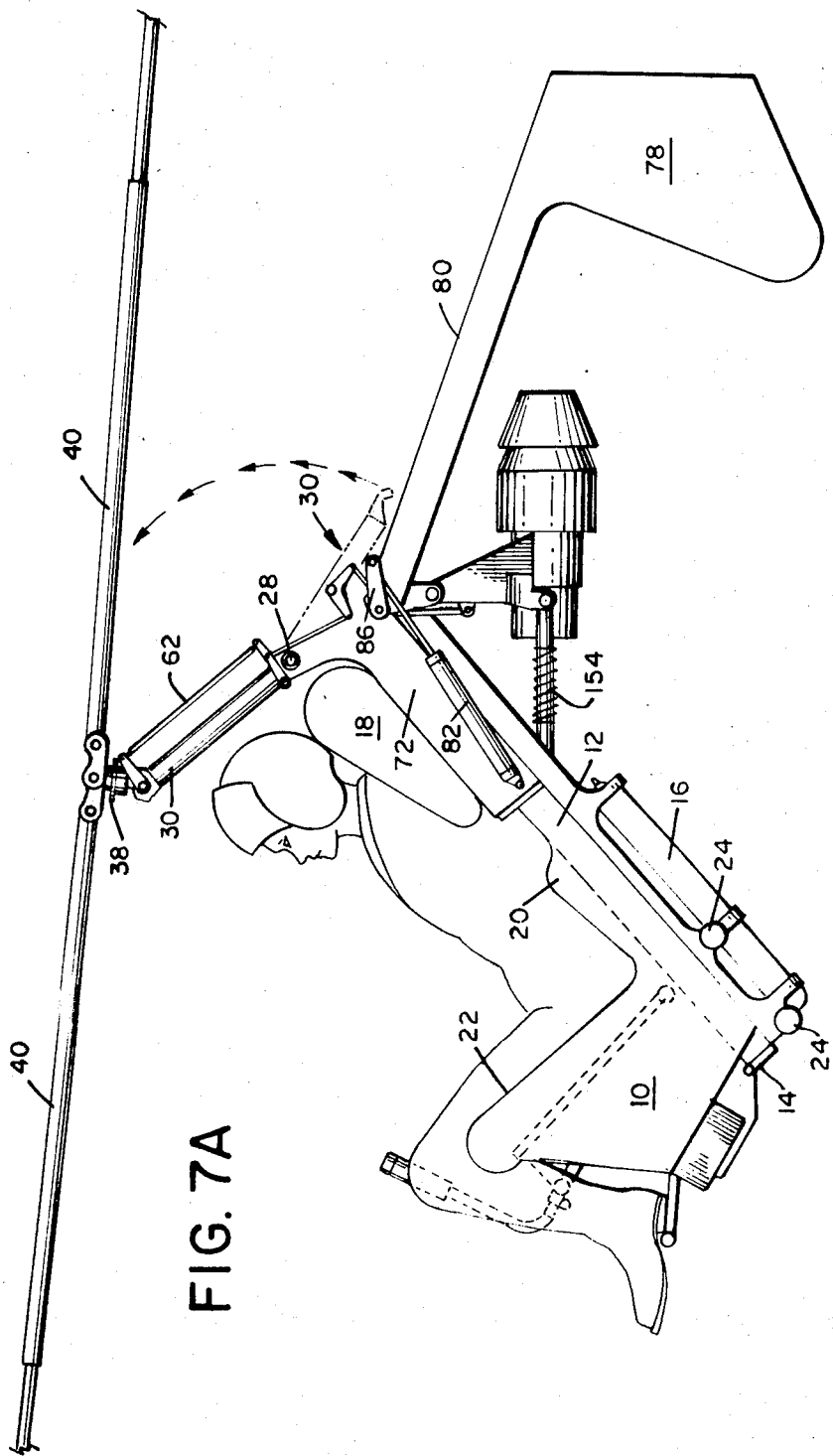

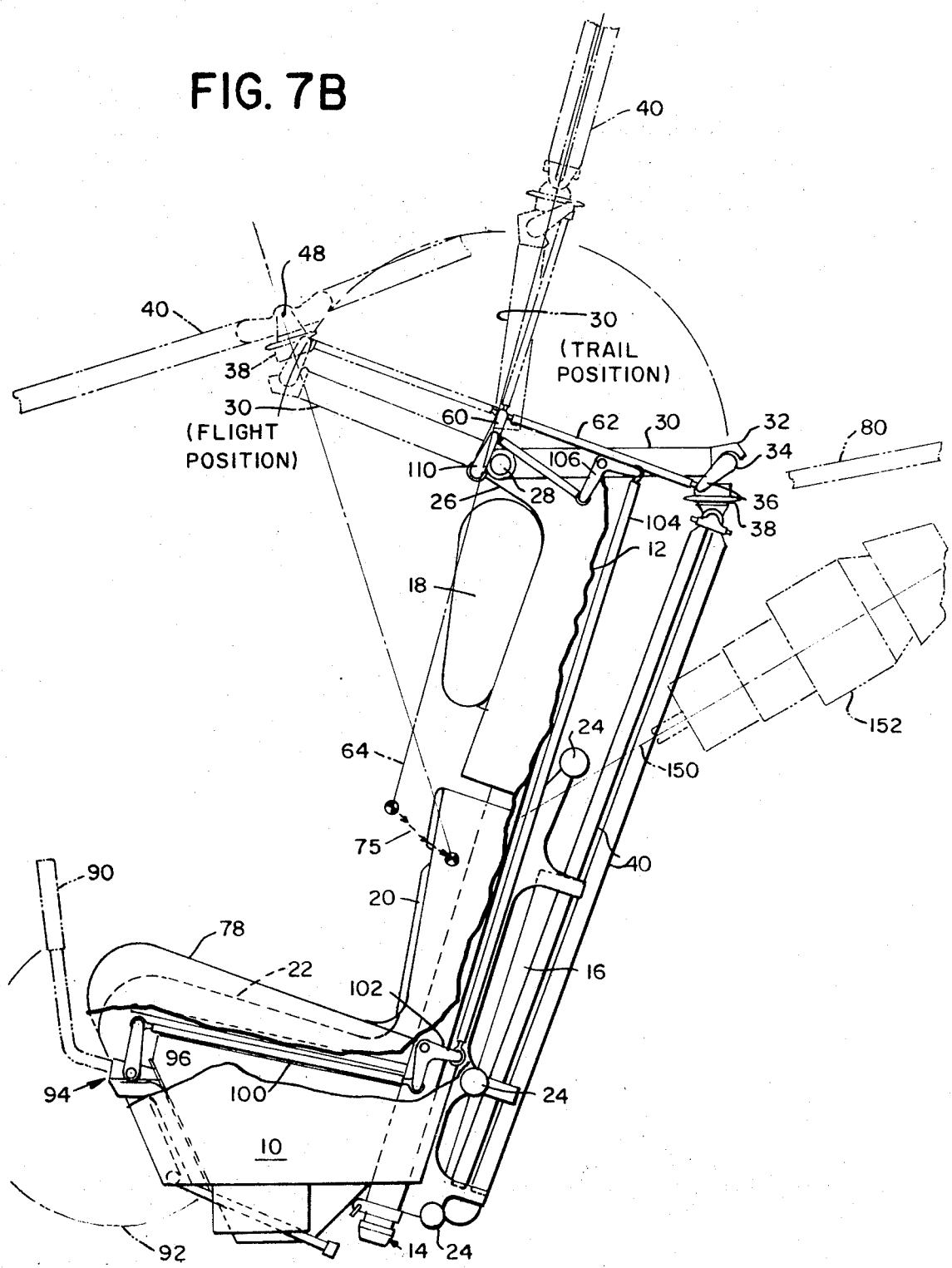

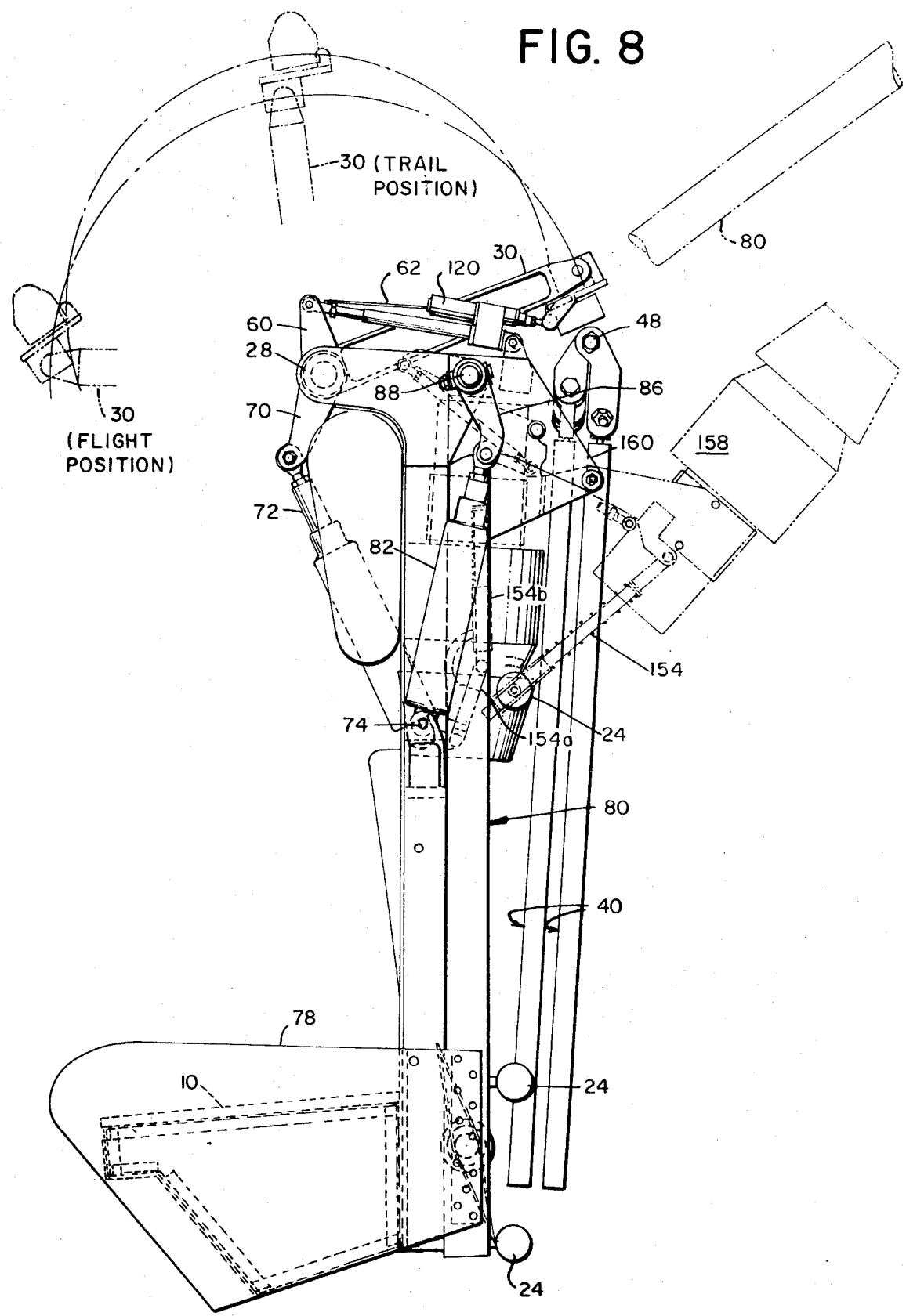

3,662,978

AIRCRAFT EJECTION SEAT VEHICLE STOWED ROTOR

BACKGROUND OF THE INVENTION

This invention relates to escape systems for aircraft, and deals more particularly with a rocket power ejection seat of the type adapted to be catapulted from a high performance aircraft. The ejection seat of the present invention is equipped with a self-contained helicopter rotor to enable the pilot to fly his seat to a more favorable landing area than would be available in a conventional ejection and bail-out situation. Prior art devices have been disclosed for housing a helicopter type rotor in an airborn vehicle, and U.S. Pat. No. 3,428,271 issued to Hollrock et al. shows an atmospheric entry vehicle having a folded helicopter type rotor stowed therein, the rotor hub being pivotally mounted at one end of a mast, which mast is in turn pivotally mounted in the vehicle. Actuating means is connected to the mast for rotating it vertically upwardly while the folded rotor is trailed aft from the free end of the mast. In its trailing position the rotor utilizes a collective pitch mechanism to skew the folded blades in opposite directions so that the rotor tends to auto rotate. Centrifugal force then causes the blades to unfold and to telescope outwardly, after which the mast is moved forwardly to an intermediate position while the rotor hub central axis is kept in line with the vehicle center of gravity. In the intermediate position collective and cyclic pitch changes can be made to achieve conventional control of the rotor blades for low speed approach and landing manuvers of the vehicle. In the above-mentioned disclosure of U.S. Pat. No. 3,428,271 a rather complex mechanism is required for controlling the angular orientation of the central axis of the rotor hub as the hub and associated blades move from the trail position to the flight position, and it is a primary aim of the present invention to provide a convenient and simple mechanism for accomplishing this purpose in the environment of an escape system for aircraft.

SUMMARY OF INVENTION

An escape system is disclosed for use in high performance aircraft, and comprises a rocket powered ejection seat mounted in the air craft on suitable guide rails or the like so as to be capable of ejection, usually in an upward direction, in case of emergency so as to carry the seat occupant away from his disabled aircraft. The seat includes a back portion, and a rotor mast is pivotally connected to the upper portion of the seat back generally behind the head of the seat's occupant. The opposite end of the mast is normally located rearwardly of the pivoted end, and supports a rotor hub on a universal joint, and a plurality of rotor blades are conventionally connected to the rotor hub. The rotor blades are adapted to be normally located in a folded condition for convenient storage behind the back portion of the seat. A small drogue or pilot chute is stored at the lower rear portion of the seat and is connected to the rotor hub by a cable somewhat longer than the rotor blades, and when the ejection seat has cleared the aircraft, the drogue chute is deployed so as to decelerate the ejection seat and to stabilize the seat so that it assumes a predetermined flight path which is generally aligned with the back portion of the seat. The drogue chute then serves to move the rotor mast from its normal or stowed position into a trail position wherein the mast is also aligned with the seat flight path, and wherein the rotor blades are also aligned with this direction as a result of the air slow pattern. The rotor blades may then be deployed, and once the rotor hub begins to rotate centrifugal force carries the blades outwardly. A unique linkage means is provided between the rotor hub and the back portion of the seat to assure that the axis of rotation of the rotor hub and its unfolding blades passes through the center of gravity of the seat occupant, at least when the mast is in its trail position.

The ejection seat also includes a portion upon which the occupant sits and a pair of tail surfaces are normally stowed one on either side of this seat portion, a pair of tail booms are associated respectively with each of these tail surfaces and are pivotally mounted to the back portion of the seat. These booms are normally stowed alongside the edges of the back portion of the ejection seat and an actuator is provided for deploying these tail booms and their associated tail surfaces to a trailing position after the rotor has been deployed in the manner just described. The tail booms, when in the stowed position may serve as the casings for the rocket/catapult system which ejects the seat from the aircraft. A second actuator rotates the rotor mast forwardly from the trail position to a gliding flight position. The central axis of the rotor hub is restrained by the linkage means during this movement so as to pass through the center of gravity of the seat and its occupant in said gliding flight position as well as in said trailing position and all intermediate positions therebetween.

A further feature of the present invention is the provision of thrust producing means stowable in the back portion of the seat, and deployable, after deployment of the rotor blades, so as to exert a thrust upon the ejection seat also directed through the center of gravity of the seat and its occupant in order to increase the range of the resulting vehicle and give the vehicle an autogyro mode of operation in addition to the gliding flight mode described above.

BRIEF DESCRIPTION OF THE DRAWINGS

FIG. 1 shows a sequence of views depicting the configuration of an aircraft and an ejection seat vehicle incorporating the present invention during the ejection phase.

FIG. 2 shows the configuration of the ejection seat vehicle during deployment of the rotor blades and the associated drogue or pilot chute.

FIG. 7A is an enlarged view of the ejection seat of FIGS. 1-5 inclusively, showing the rotor and thrust producing means in their deployed flight positions.

FIG. 7B shows the ejection seat vehicle of FIGS. 1-5, the rotor blades being shown in their stowed positions in solid lines, the trail position of the blades and associated rotor mast being shown in phantom lines, and the flight configuration of the unfolded rotor blades and associated rotor mast also being shown in a position corresponding to FIG. 7A in phantom lines. The thrust producing unit is shown in solid lines in its stowed condition, and in phantom lines in its deployed condition or flight position.

FIG. 8 is a view similar to FIG. 7B but showing the linkages and actuators associated with moving the rotor mast and the tail plane booms of the previous views.

DETAILED DESCRIPTION

Figure 3:
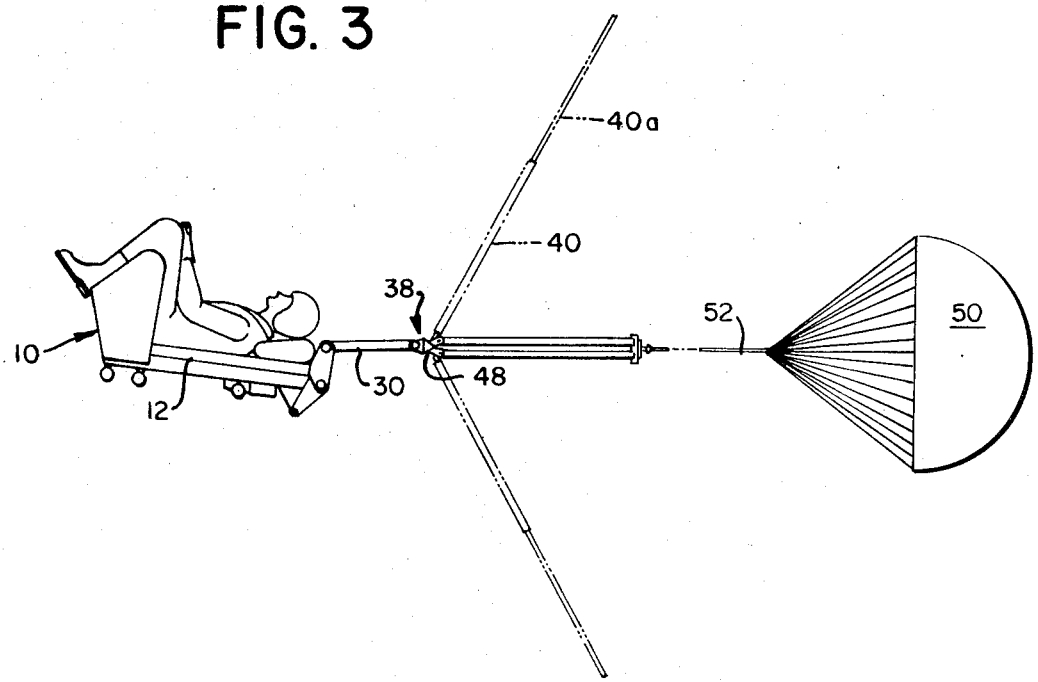
FIG. 3 shows the rotor deployment at a slightly later instant of time as the blades themselves are unfolded and telescoped outwardly due to centrifugal force induced thereupon by rotation of the rotor.

Turning now to the drawings in greater detail, FIGS. 1 through 6 show schematically the sequence of operation of the ejection seat vehicle incorporating a stowed rotor and other components constructed in accordance with the present invention. The ejection seat includes components found in a conventional ejection seat and these components are best shown in FIGS. 7A and 7B as comprising a seat portion 10 upon which the crewman is adapted to be seated while in his crew position, an upstanding back portion 12 which is substantially thicker in depth than a conventional ejection seat, especially adjacent its upper end portion. The back portion 12 includes conventional components, as for example a catapult 14 sustainer rockets 16, 16, a combination head rest and personal type parachute 18 and a lumbar pack 20. The seat portion 10 of the ejection seat includes a seat cushion 22 which contains a conventional survival kit, and still with reference to the conventional components of the ejection seat, the back portion 12 of the ejection seat includes a plurality of guide rollers 24, 24 which are adapted to ride in tracks (not shown) provided for this purpose in the aircraft to guide the ejection seat during the ejection phase shown in FIG. 1.

Figure 9:
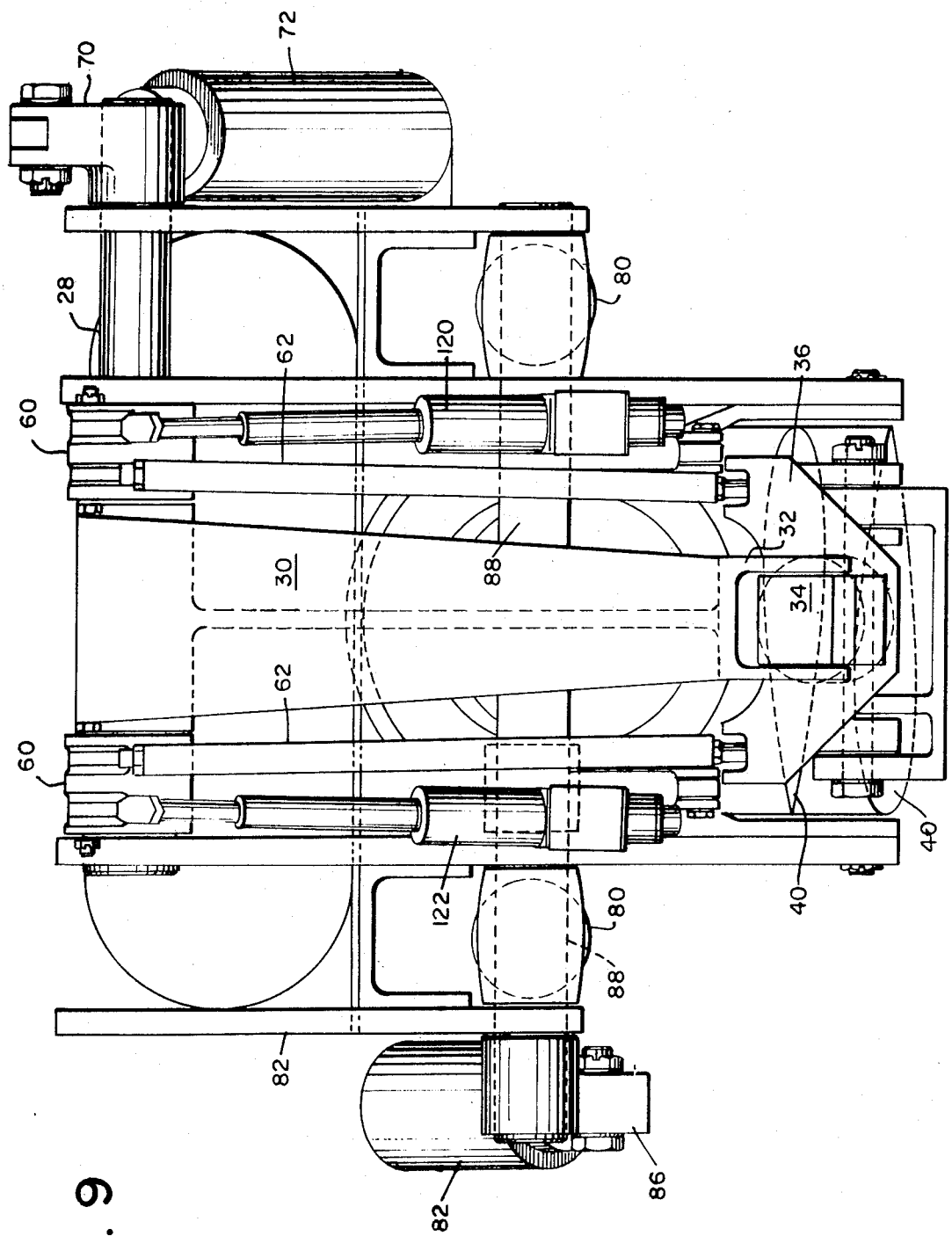
FIG. 9 is a plan view of the ejection seat shown in FIG. 8 with the rotor mast in its stowed configuration and the rotor blades in their stowed configuration behind the thrust producing means.

In accordance with the presently preferred embodiment of this invention the upper end portion of the back 12 of the ejection seat defines a forwardly protruding upper end portion 26 which defines a pivot for rotatably supporting a first rock shaft 28 shown in plan view in FIG. 9. The rock shaft 28 carries a rotor mast 30, one end of the mast being pivotally connected to the upper portion of the seat back portion 12 by the rock shaft 28, so that the rotor mast 30 extends rearwardly behind the head of the seats occupant, and has an opposite end portion 32 which is pivotally connected, preferably by means of a universal joint 34 to a crank arm 36 to be described.

A rotor hub 38 is pivotally connected to the lower end of the depending crank arm 36 and to the universal joint 34. The hub 38 carries a pair of rotor blades 40, 40 conventionally connected thereto by an articulated joint 48 best shown in FIG. 8 and flapping hinge pins 42, 42.

In order to move the rotor mast 30 and its associated rotor hub 38 and rotor blades 40, 40 from the stowed position shown in solid lines in FIGS. 7 and 8, to a trail position indicated generally by the phantom lines extending vertically upwardly in the same general direction as the back portion 12 of the ejection seat, a drogue or pilot chute 50 is connected to the rotor hub 38 by a lanyard or cable 52 somewhat longer in length than the length of the rotor blades 40. Means is provided for deploying the drogue chute from a stowed position (not shown) wherein the chute is stored between the rotor blades 40, 40 and a deployed position as shown in FIGS. 2 and 3 in order to decelerate the ejection seat following the ejection phase described with reference to FIG. 1, and for stabilizing the seat so that it follows a predetermined flight path which is generally aligned with the back portion 12 of the seat as best shown in FIG. 2. Also, by connecting the lanyard to the articulated joint 48 it will be seen that the drogue chute also serves to deploy the rotor hub and blades. Deployment of the drogue chute is conventionally accomplished after a predetermined time delay following ejection. The drogue chute 50 also serves to move the mast 30 from its normal stowed position to the trail position suggested in FIG. 7 where it is aligned with the seat flight path. The actuator 72 is designed to compress slightly during this movement of the mast.

The rotor blades will of course pivot around the rotor hub to align themselves generally with the mast 30, and it is a feature of the present invention that linkage means is provided connecting the rotor hub 38 to the seat back portion 12 in order to assure that the axis of rotation of the rotor hub and its unfolding blades passes through the center of gravity of the seat vehicle, including the occupant. Preferably, said linkage means comprises the above mentioned first laterally extending rock shaft 28 pivotally supported in the upper end of the back 12 of the ejection seat, and includes crank arm means 60, 60 in the form of a pair of crank arms mounted on the said rock shaft 28. Said linkage means further includes push rod means in the form of a pair of generally parallel push rods 62, 62 located on either side of the mast 30 as best shown in FIG. 9. Each push rod 62 is pivotally connected at one end to one of the crank arms 60 and at its opposite end to a second crank arm 36 associated with the rotor hub 38 described hereinabove. The lengths of these crank arms, and their associated angular relationships are so chosen that the axis of the rotor hub 38 passes downwardly along the line indicated generally at 64 in FIG. 7B as the rotor hub and associated blades reach the trail position shown therein. Thus, as the mast 30 moves upwardly and forwardly from its stowed position shown in solid lines in FIG. 7B to the trail position shown in broken lines the axis of the rotor hub is caused to pass downwardly through the center of gravity of the seat vehicle in order to preserve a stable platform prior to deployment of the rotor as suggested in FIG. 3. As mentioned above, the rotor hub and rotor blades are deployed to the trail position in response to deployment of the drogue chute 50. Unfolding of the rotor from this trail configuration may be accomplished by any convenient means, as for example as described in the above mentioned patent to the inventors herein, or as for example by severing a cord, which normally holds the blades in their folded condition, and which can be cut simultaneously with release of the drogue chute itself. When the rotor blades 40, 40 do begin to rotate, centrifugal force will cone these blades downwardly and will cause telescoping outer end portions 40A, 40A as shown in FIG. 3 to deploy in order to increase the size of the resulting rotor.

As best shown in FIGS. 8 and 9, the first rock shaft 28 is additionally provided with a crank arm 70 which is adapted to be rotated through a predetermined angular displacement as a result of extension of the linear actuator 72 one end of which is pivotally carried on the depending crank arm 70 and the other end of which is pivotally supported in the back portion of the seat as indicated generally at 74. Thus, as the rotor mast 30 moves from the trail position described above to the next broken line position shown wherein the crank arm 70 is generally horizontal the rotor will have been deployed as suggested in FIGS. 4 and 5. Thus, the actuator 72 does not function during movement of the mast 30 to the trail position, but is energized causing further counterclockwise rotation of the depending crank arm 70 and in turn causing further counterclockwise rotation of the rotor mast 30 from the trail position shown to the gliding flight position shown in FIGS. 4 and 5 wherein its free end portion is located forwardly and above the head of the occupant of the seat as also shown in FIG. 7A. It is an important feature of the present invention that as the rotor mast 30 is so moved the linkage means described above with reference to the crank arm 60 and the push rods 62 cooperate to restrict the orientation of the axis of the rotor hub 38 so that said axis continues to pass downwardly through a point which is substantially fixed in relationship to the seat and its occupant as suggested in FIG. 7B. Actually, the location of this point is dictated by the center of gravity location of the vehicle, and moves slightly rearwardly and downwardly as indicated generally by the direction of the series of arrows shown at 75 in order to compensate for the center of gravity location shift resulting from simultaneous deployment of the tail plane and thrust propulsive means associated with the ejection seat and to be described in greater detail hereinbelow. However, it is an important feature of the present invention that this axis of rotation of the rotor hub 38, when the mast 30 and the hub 38 are located in the gliding flight position shown in FIGS. 7A that this axis passes through the center of gravity of the vehicle at this particular instant of time.

Figure 4:
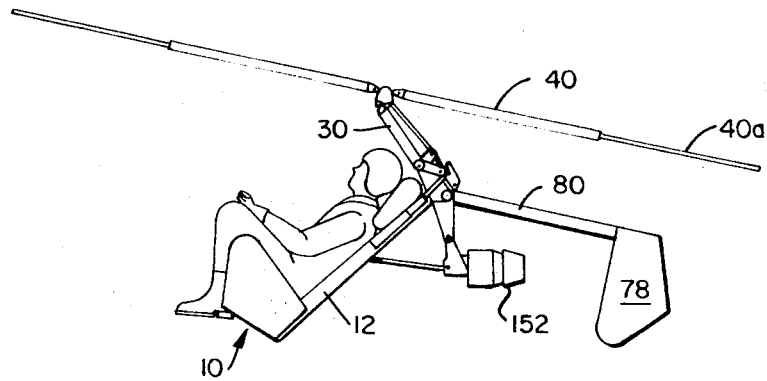
FIG. 4 shows the ejection seat vehicle in a flight position, with a thrust producing means in position for achieving an autogyro mode of operation of the vehicle.
Figure 5:
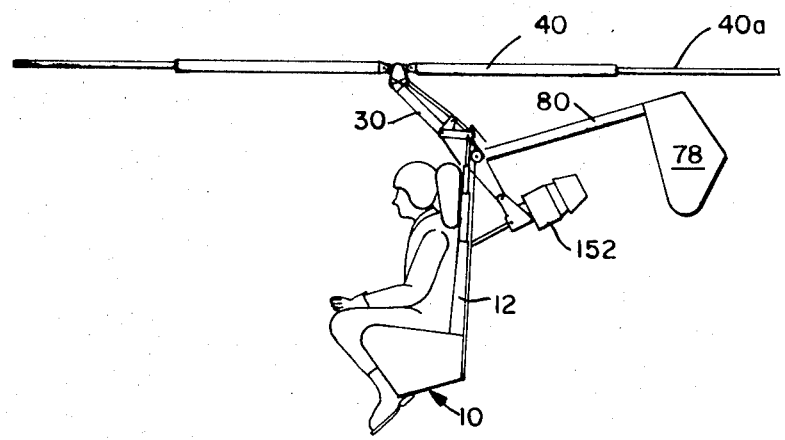
FIG. 5 shows the gliding flight mode of operation reached upon expenditure of all fuel in the vehicle, the thrust producing means being shown in a deployed position but subsequent to its operation thereof.

It is another important feature of the presently preferred embodiment shown and described herein that the resulting ejection seat vehicle with deployed rotor as depicted in FIG. 4 is equipped with an anti-torque tail empennage structure which is deployed at substantially the same time as forward movement of the rotor mast 30 in the manner just described. More particularly, and referring especially to FIGS. 7A and 7B, a pair of vertical tail surfaces 78, 78 are preferably stowed adjacent the side portions of the seat 10 upon which the occupant is seated, and these tail surfaces are mounted on twin booms 80, 80 pivotally supported adjacent the upper end of the back portion 12 of the ejection seat, and oriented in their stowed configuration along the sides of the seat. One such boom 80 is shown in FIG. 8 in its stowed configuration and supports an associated generally vertically oriented tail surface 78 in position on the left-hand side of the seat structure 10. Means is provided for deploying the tail structure just described, and preferably said means comprises an actuator 82 generally similar to the actuator 72 described hereinabove for moving the rotor mast 30 into its gliding position, and the actuator 82 associated with the tail structure is connected to the seat back portion at the opposite side edge thereof for movement between the solid line position (FIGS. 8 and 9) and an extended position (FIG. 7A). The free end of the actuator 82 is connected to a crank arm 86 which in turn is carried by a rock shaft 88 upon which the booms 80, 80 are supported as best shown in FIG. 9. As suggested in FIG. 5, when the rotor has been deployed to its gliding flight condition and the tail structure deployed as there shown the resulting seat is adapted for gliding flight at a substantial angle to the seat back portion, with the result that the occupant of the seat has relatively good visibility in the forward flight direction so as to guide his craft downwardly to a safe landing area. Referring now more particularly to FIG. 7B, means is provided for controlling the cylic pitch of the rotor in this gliding mode or auto rotating flight condition, and said means preferably includes a control column 90 which is adapted to be moved in the direction of the arrow 92 from a stowed configuration by a spring mechanism or the like in conjunction with deployment of the rotor to a position between the knees of the seat occupant. The control column 90 is connected through a conventional control linkage to the rotor hub 38, and preferably said control linkage includes at least in part the linkage associated with maintaining the orientation of the rotor hub axis as described above. More particularly, fore and aft movement of the control column 90 about the universal joint indicated generally at 94 causes pivotal movement of the crank arm 96 resulting in translation of the push rod 100. This motion of the push rod 100 is adapted to rotate the bell crank 102 on its axis which is fixed in the ejection seat frame, with the result that vertical movement of the push rod 104 is obtained causing rotational movement of the bell crank 106 and substantially linear movement of the push rod 108. Push rod 108 is connected to a secondary crank arm 110 located on the same shaft 28 associated with the first crank arm 60 mentioned above. As so constructed and arranged angular rotational movement of the secondary crank arm 110 associated with the pitch control mechanism described above results in corresponding angular rotation of the primary crank arm 60 and hence is adapted to move the push rod 62 associated with the linkage described above for maintaining the rotor hub axis along the particular orientation with the result that a dual function of this linkage is made possible with the present design.

Lateral pitch control of the rotor hub is achieved through the universal mounting 94 for the control column 90 described above and through position sensors associated with said universal joint (not shown), which sensors operate in conjunction with a controller (not shown) for operation of the differential actuators indicated generally at 120 and 122 in FIG. 9. These differential actuators operate in a conventional manner as described with the reference to the above mentioned patent to the inventors herein, and need not be described in detail in this disclosure. Briefly, these actuators serve to restrain the rotor hub 38 against lateral tilting movement except when the control column is laterally deflected from its neutral position resulting in differential displacements of the actuators in response to angular lateral displacements of the control column 90.

A still further feature of the preferred embodiment of the present invention shown in the accompanying drawings is attributable to the thrust producing means normally stowed in a cavity defined in the back portion 12 of the ejection seat, said thrust producing means comprising a small gas turbine engine adapted to be moved from its stowed position to a thrust producing position wherein the thrust line of the engine is directed along a line indicated generally at 150 in FIG. 7 located so as to pass through the center of gravity of the resulting vehicle as described above with reference to the center of gravity location resulting from deployment of the tail plane. It will be appreciated that the change in center of gravity location indicated generally at 75 is created not only by deployment of the tail plane, but also as a result of deployment of the gas turbine engine 152 shown in FIG. 7A when the engine moves from its broken line position shown in that view to its deployed position.

As best shown in FIGS. 7A and 8, the mounting means for the engine 152 is linked to the arm 86 associated with deployment of the tail booms 80, 80 and hence the engine 152 will be deployed at the same time as the tail surfaces 78, 78 through the actuator 82 described above. The mounting means comprises a thrust absorbing linkage in the form of a primary strut 154 located generally in line with the axis of the thrust producing means 152, in its deployed position. The strut 154 includes a short link 154a pivotally supported in the back 12 of the seat. A tubular member 154b carried on the strut 154 is spring loaded downwardly to lock the short strut 154a in line with the strut 154. The member 154b is held back in the stowed position of the engine by a C-shaped member 156. When deployed the C-shaped member allows the tubular member 154b to drop over the joint between these struts as shown. The engine 152 carries a support 158 which is hinged to a bracket 160 on the seat. A link 162 acts between the engine support 158 and an arm 164 on the same rock shaft 88 as that for the arm 86 so that the engine 152 is deployed simultaneously with the empennage.

Fuel for the power plant 152 is carried to the power plant in its extended position by means of a flexible line (not shown) and the fuel for the engine is stored in a fuel cell located in the seat portion 10 of the ejection seat. The provision for a thrust producing means in the ejection seat vehicle provides an autogyro mode of operation, best shown in FIG. 4, whereby the occupant can achieve a positive rate of climb with his vehicle, and can of course increase his range of operation from a disabled craft in a manner not dependent entirely upon the altitude at which he left the disabled aircraft as would be true of a vehicle having only the gliding mode of operation depicted in FIG. 5. For example, should the occupant leave his disabled aircraft at low altitude the power plant 152 will permit him to gain altitude as well as to proceed in the desired direction, and after exhausting the fuel carried in the cell mentioned above the occupant can fly the vehicle in the auto rotative, or gliding flight mode even further in this direction.

To summarize the operation of the escape vehicle described hereinabove, the ejection seat is conventionally catapulted from a disable aircraft as suggested in FIG. 1, and when the aircraft has been safely cleared, the drogue chute 50 deploys and is inflated by the air stream. The attached lanyard pulls the stowed rotor blades aft and upward to a trail position and rotates the seat so that its back portion is at or near a horizontal attitude. The drogue chute serves not only as an aerodynamic braking device but also as a stablizing device to assure that this configuration and flight path are reached. It also serves to deploy the rotor blades to their trail positions as shown in FIG. 2. The lanyard or cable 52 is then severed, and a blade restraint cable or the like is severed so that the rotor blades are swept slightly to initiate spin up of the rotor. Aerodynamic torque causes the rotor to spin up to a design speed, and centrifugal force extends the telescoped blades to their full span. The blades will reach an equilibrium coning position when the rotor obtains the designed coning or governing speed. This speed is limited by the flaping hinge pin location and other known parameters. If the rotor tends to overspeed the blades will cone at a lower angle. The differential angle between the articulated joint 48 and the flaping hinge pins 42, 42 produces an increase in blade pitch which reduces the rotor speed. Conversely if the rotor speed falls below a predetermined design speed this geometry causes blade pitch to decrease, and rotor speed to increase.

Energization of the actuators 72 and 82, associated with the rotor mast 30 and the tail boom 80 respectively, can then be accomplished with the result that the vehicle will transition to an auto rotative, or gliding mode of flight, best shown in FIG.

5. The power plant or gas turbine engine 152 is deployed simultaneously with extension of the tail booms 80, 80 and hence firing of the engine results in an autogyro mode of operation enabling the occupant of the ejection seat to further increase his range of flight in a desired direction.

Figure 6:
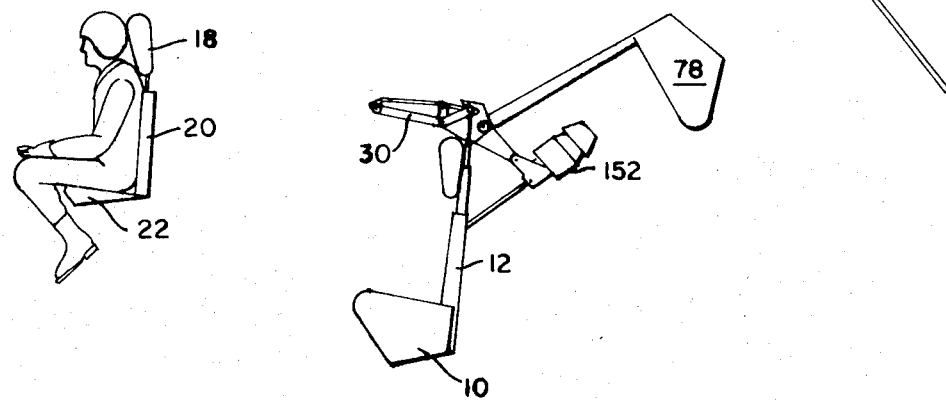
FIG. 6 shows the seat occupant upon separation from his seat and prior to the opening of his personal parachute.

Finally, the occupant may elect to separate from his ejection seat as shown in FIG. 6 of the drawings, and make a conventional parachute let down once he has reached a desired landing area. If this course of action is elected, conventional means (not shown) is provided for automatically releasing the rotor at the same time that the occupant separates from the seat so as to preclude injury from the rotating blades.

I claim:

1. An escape system for aircraft comprising an ejection seat adapted for mounting in the aircraft cockpit on guide rails or the like for upward ejection in case of emergency with the occupant facing in the direction of aircraft flight, said seat including a back portion and a seat portion, a mast having one end pivotally connected to the upper portion of said seat back portion behind the head of the seat's occupant, an opposite end of said mast normally located rearwardly of said one end, a rotor hub pivotally carried by said opposite end of said mast, at least one rotor blade carried by said hub and normally located in a folded condition for being stowed behind the seat back portion, a drogue chute connected to said rotor hub by a cable somewhat longer than said rotor blade, means for deploying said drogue chute for decelerating said seat following ejection and for stabilizing said seat so that it follows a predetermined flight path which is generally aligned with the back portion of said seat, said drogue chute also serving to move said mast from said normal position into a trail position wherein said mast is also aligned with said seat flight path, and said rotor blade being pivotally carried by said hub also tending to align itself generally with said mast, means for unfolding said folded rotor blade so that the hub rotates on its axis, and linkage means connecting said rotor hub to said seat back portion to assure that the axis of rotation of said hub and its unfolding blade passes through the center of gravity of the seat and the seat occupant at least when said mast is in its trail position.

2. The escape system of claim 1 further characterized by a pair of tail surfaces normally stowed one on either side of the seat portion of said ejection seat, a tail boom for each tail surface normally stowed on the corresponding side of said ejection seat back portion and supporting its associated tail surface in its stowed position, means for deploying said tail booms so that they extend rearwardly from the seat back portion, and means for swinging said rotor hub supporting mast forwardly and downwardly relative to said seat back portion to a gliding flight position so that said seat and rotor are stabilized by said tail surfaces for gliding flight at a substantial angle to said seat back portion, and said linkage means connecting said motor hub to said seat back portion serving to hold said hub relative to said mast so that the axis of rotation of the hub passes through the center of gravity of the seat and its occupant at least when said mast and rotor hub are in said gliding flight position.

3. The escape system of claim 2 further characterized by thrust producing means normally stowed in a cavity defined in the back portion of said ejection seat, and means for movably mounting said thrust means to said seat back portion and for linking the thrust means to said tail booms for deploying the thrust means with said tail surfaces, said thrust means when deployed having its thrust axis oriented on a line passing through the center of gravity of the seat and its occupant.

4. The escape system of claim 3 wherein said tail booms are pivotally mounted to said seat back portion and on either side of said stowed mast, said stowed rotor comprising at least two blades, both of which are stowed behind the stowed thrust means and between said stowed tail booms.

5. The escape system of claim 4 and further characterized by a control column pivotally mounted to the seat for movement from a normally stowed position adjacent the underside of the seat portion to a deployed position between the knees of the seat occupant, and control linkage between said control column and said linkage means to vary the orientation of said rotor hub axis in a vertical plane in response to fore and aft movement of the control column to permit the seat occupant to control the longitudinal cyclic pitch of the rotor blades.

6. The escape system of claim 1 wherein said linkage means includes a first laterally extending rock shaft for pivotally supporting said mast, crank arm means on said first rock shaft, push rod means pivotally connected at one end to said crank arm means and at an opposite end to said rotor hub for altering the angular orientation of said rotor hub with respect to said mast as the mast moves upwardly and forwardly.

7. The escape system of claim 6 further characterized by a pair of tail surfaces normally stowed one on either side of the seat portion of said ejection seat, a tail boom for each tail surface normally stowed on the corresponding side of said ejection seat back portion and supporting its associated tail surface in its stowed position, means for deploying said tail booms so that they extend rearwardly from the seat back portion, and means for swinging said rotor hub supporting mast forwardly and downwardly relative to said seat back portion to a gliding flight position so that said seat and rotor are stabilized by said tail surfaces for gliding flight at a substantial angle to said seat back portion, and said linkage means connecting said rotor hub to said seat back portion serving to hold said hub relative to said mast so that the axis of rotation of the hub passes through the center of gravity of the seat and its occupant at least when said mast and rotor hub are in said gliding flight position.

8. The escape system of claim 7 further characterized by thrust producing means normally stowed in a cavity defined in the pack portion of said ejection seat, and means for movably mounting said thrust means to said seat back portion and for linking the thrust means to said tail booms for deploying the thrust means with said tail surfaces, said thrust means when deployed having its thrust axis oriented on a line passing through the center of gravity of the seat and its occupant.

9. The escape system of claim 8 wherein said tail booms are pivotally mounted to said seat back portion and on either side of said stowed mast, said stowed rotor comprising at least two blades, both of which are stowed behind the stowed thrust means and between said stowed tail booms.

10. The escape system of claim 9 and further characterized by a control column pivotally mounted to the seat for movement from a normally stowed position adjacent the underside of the seat portion to a deployed position between the knees of the seat occupant, and control linkage between said control column and said linkage means to vary the orientation of said rotor hub axis in a vertical plane in response to fore and aft movement of the control column to permit the seat occupant to control the longitudinal cyclic pitch of the rotor blades.

11. The escape system of claim 10 wherein said control linkage between said control column and said linkage means comprises second crank arm means on said first rock shaft movable in response to forward aft movement of said control column.

12. The escape system of claim 11 wherein said rotor hub is pivotally connected to said mast by a universal joint to permit lateral tilting movement of said rotor hub at least in the gliding flight position thereof, and a pair of linear actuators for restraining said rotor hub against lateral tilting movement, said control column being operatively connected to said linear actuators for achieving differential displacement of said actuators in response to angular lateral displacements of said control column.

13. The escape system of claim 12 wherein said push rod means comprise a pair of push rods and said first crank arm means comprises a pair of crank arms symmetrically arranged on either side of the mast, said linear actuators comprising a pair of telescoping actuators having movable portions connected to laterally spaced locations of a non rotating portion of the rotor hub, and said pair of actuators having relatively fixed portions carried by said pair of push rods respectively.

* * * * *